Patented Sept. 18, 1951

2,568,642

UNITED STATES PATENT OFFICE 2,568,642

PRODUCTION OF DICHLORODODECA-
FLUOROHEPTANE AND DERIVATIVES
THEREOF

Karl W. Krantz, Wilmington, Del., assignor to
the United States of America as represented
by the United States Atomic Energy Commission No Drawing. Application April 5, 1946,
Serial No. 659,856

4 Claims. (Cl. 260—653)

This invention relates to the production of dichlorododecafluoroheptane and to the provision of a novel method for obtaining chlorine-free perfluoroheptane and dodecafluoroheptene.

It has previously been proposed to manufacture perfluoroheptane from normal heptane by a process involving chlorination of the normal heptane and fluorination of the chlorinated product first to replace a major proportion of the chlorine atoms and then to replace residual hydrogen and chlorine and saturate the product. In processes involving this sequence of steps a mixture of perfluoroheptane, monochloroperfluoroheptane and dichloroperfluoroheptane is obtained. The perfluoroheptane is readily separable from the mono- chloro- and dichloro-perfluoroheptanes by fractional distillation. However, the separated product still contains from 2% to 3% by weight of chlorine which is not separable by simple fractional distillation. This chlorine appears to be present in the form of chlorinated organic compounds boiling from perfluoroheptane mixtures in the same boiling range as the perfluoroheptane.

It is an object of the present invention to provide a method of making chlorine-free perfluoroheptane. A further object is to provide a dichlorododecafluoroheptane which may be fluorinated to produce perfluoroheptane and which is free from compounds forming, upon further fluorination, fluoro-chloro compounds not separable from the perfluoroheptane by fractional distillation. A still further object of the invention is to provide a process for the manufacture of dodecafluoroheptene free from chlorine derivatives. Further objects of the invention will appear from the following description and illustrative examples.

The process of the invention entails the following steps, (1) normal heptane is chlorinated in conventional fashion, for example, by passing elemental chlorine through the heptane in the presence of ample illumination, to produce a polychloroheptane product containing from about 80% to about 83% of organic chlorine, corresponding to about 10 to 12 chlorine atoms per molecule; (2) the resulting polychloroheptane product is treated with a pentavalent antimony halide fluorinating agent so as to replace part of the chlorine by fluorine and provide a fluorinated product containing at least 50% fluorine; (3) the product of this treatment is fractionally distilled to provide a fraction distilling between about 70° C. and about 74° C. at standard pressure; (4) this fraction is then chlorinated to a chlorine content of about 20% chlorine by weight, (5) the chlorinated product is fractionally distilled to separate a dichlorododecafluoroheptane fraction boiling at about 126° C. at standard pressure.

The dichlorododecafluoroheptane fraction so obtained appears to be free of the contaminating impurities which are responsible for the difficultly removable chlorine in the former perfluoroheptane products. The elimination of objectionable materials occurs in steps (4) and (5). Step (3), by eliminating other contaminants, facilitates complete separation of the objectionable compounds in step (5).

The dichlorododecafluoroheptane product may be fluorinated by means of cobalt trifluoride or silver difluoride to produce a mixture of perfluoroheptane and monochloroperfluoroheptane. From this mixture a chlorine-free perfluoroheptane may be obtained by simple fractional distillation with rectification. To recover a high yield of perfluoroheptane from the dichlorododecafluoroheptane, the latter product may be subjected to an intermediate treatment with alcoholic zinc. This treatment removes the two chlorine atoms and forms dodecafluoroheptane substantially free from organic chlorine. The dodecafluoroheptene may be subjected to fluorination by treatment with cobalt trifluoride or silver difluoride in the same manner as the dichlorododecafluoroheptane. However, since the heptene derivative contains no chlorine, essentially the entire product of this fluorination is perfluoroheptane.

While the purified dichlorododecafluoroheptane and dodecafluoroheptene have been described as being useful for the manufacture of chlorine-free perfluoroheptane, it will be understood that these compounds have distinctive characteristics which render them useful for a variety of purposes and that their utility is not limited to the manufacture of chlorine-free perfluoroheptane.

The chlorination steps of the process of the invention may be carried out merely by contacting the organic compound or mixture of compounds with gaseous chlorine in the presence of light. The rate of chemical absorption of the chlorine increases with the intensity of the light. The temperature of chlorination is maintained at or below the boiling point of the mixture and loss by vaporization is avoided by provision of a reflux condenser. As the chlorination proceeds, the boiling point of the mixture rises so that the temperature can be gradually increased. High temperatures aid the reaction by reducing the viscosity of the liquid and by accelerating reaction of the chlorine.

The fluorination step may be carried out with a fluorine salt of antimony such as antimony pentafluoride or an antimony fluorochloride containing three or more atoms of fluorine per molecule. A convenient process involves the use of anhydrous hydrogen fluoride with a halide of pentavalent antimony as a carrier. In this treatment the antimony halide composition may fluctuate depending upon the conditions of fluorination and the rate of introduction of hydrogen fluoride. Whether the fluorination is conducted by means of hydrogen fluoride and pentavelent antimony salts as carrier media or by means of antimony pentafluoride, the main consideration is the treatment of the polychloroheptane to provide a fluorinated product which yields a substantial proportion of the desired 70° C. to 74° C. fraction. In a series of treatments of polychlorinated heptane by a hydrogen fluoride-antimony pentafluoride sequence of fluorinations, yields of the desired 70° C. to 74° C. fraction varied from 5% to 25% with an average of about 14%. A single treatment with hydrogen fluoride in the presence of antimony fluorochlorides ordinarily does not provide a fluorine content as high as desirable but the product of such a treatment may have its fluorine content increased by passing it over pentavalent antimony fluorochlorides adsorbed on activated carbon, at a temperature of about 200° C. Such a treatment has produced a product comprising between 12% and 13% of the desired 70° C. to 74° C. fraction.

The following example further illustrates the application of the present invention. Quantities and proportions are expressed in terms of weight unless otherwise indicated.

*Example*

Sixteen parts of a polychloroheptane product obtained by photo-chemical chlorination of normal heptane at a temperature rising from about 15° C. initially to about 115° C. is placed with seven parts of anhydrous antimony pentachloride in a Monel reactor and anhydrous hydrogen fluoride is introduced into the mixture gradually for three hours while the mixture is maintained at about 100° C. About seven parts of hydrogen fluoride is introduced in this manner. The reaction mixture is cooled and the organic product is decanted off from the solid antimony salts.

The organic product and approximately twice its weight of anhydrous antimony pentafluoride are introduced into an aluminum reactor and heated for about 12 hours at 180° C. The product contains about 55% fluorine and about 23% chlorine. This product is fractionally distilled with rectification to recover a fraction boiling between 70° C. and 73° C. at standard pressure.

The 70° C. to 73° C. fraction has a chlorine content of approximately 2.8%. This product is chlorinated by means of gaseous chlorine in the presence of light from a 360BL tube, which is a fluorescent tube emitting most of its energy in the range of 3600-3650 Å, immersed in the liquid. The chlorination mixture is cooled at first by immersion in ice water and the temperature is allowed to rise gradually in a period of about one and one-quarter hours to 45° C. After chlorination for about eighteen hours, the product is washed with aqueous sodium bicarbonate-sodium thiosulfate solution and dried with anhydrous calcium sulfate. The product is water-white and contains about 20% of organic chlorine. The product is subjected to fractional distillation with rectification. Rectification data for samples of the 70° C. to 73° C. fraction and its chlorination product are as follows:

For the 70° C. to 73° C. fraction:

| Vapor Temperature, °C. | Total Distillate (Vol. Per Cent of Distillant) |
|---|---|
| 68.0 | 2 |
| 69.1 | 5 |
| 70.0 | 10 |
| 70.2 | 22 |
| 70.4 | 31 |
| 70.6 | 66 |
| 70.8 | 88 |
| Residue | 6 |

For the chlorinated product:

| Vapor Temperature, °C. | Total Distillate (Vol. Per Cent of Distillant) |
|---|---|
| 119 | 2 |
| 125 | 4 |
| 125.8 | 6 |
| 125.9 | 9 |
| 126.0 | 26 |
| 126.2 | 42 |
| 126.3 | 52 |
| 126.5 | 60 |
| 126.8 | 70 |
| 128.0 | 82 |
| 130.0 | 88 |
| 131.1 | 90 |
| Residue | 10 |

The fraction distilling between 125.8° C. and 126.8° C. amounts to 64 milliliters. It contains approximately 19% chlorine and 62% fluorine and has a molecular weight of 386.

Thirty-four parts of this fraction is mixed with 32 parts of absolute ethyl alcohol and 15 parts of granulated zinc. The mixture is warmed in an Erlenmeyer flask under a reflux condenser. After a short warming period an exothermic reaction begins and a separate lower liquid layer forms. The mixture is refluxed gently for four hours. The lower layer is then separated, washed with water, dried with anhydrous calcium sulfate, and distilled with rectification. Data for this distillation are as follows:

| Vapor Temperature, °C. | Total Distillate (Vol. Per Cent of Distillant) |
|---|---|
| 70.0 | 3.3 |
| 70.4 | 16.7 |
| 70.8 | 30.0 |
| 71.0 | 43.3 |
| 73.0 | 50.0 |
| 75.0 | 53.3 |

The fraction distilling from 70.0° C. to 71.0° C. and comprising 6 milliliters is found to contain 0.0% chlorine and 73.5% fluorine and to have a molecular weight of 310-315. These values correspond closely to the theoretical values for the formula of dodecafluoroheptene, $C_7H_2F_{12}$.

The dodecafluoroheptene may be converted to perfluoroheptane by passing it in vapor phase into contact with silver difluoride or cobalt trifluoride. For example, by passing the mixture successively through three reaction chambers containing trays of silver difluoride maintained at 245° C., 280° C., and 335° C., respectively, the residual hydrogen is replaced and the double bond is saturated with fluorine and a product comprising essentially perfluoroheptane is obtained. Similar results may be obtained by using cobalt trifluoride at temperatures of 315° C., 330° C., and 350° C. in the three reaction chambers.

It will be understood that I intend to include variations and modifications of the invention and that the preceding example is illustrative only and in no wise to be construed as limitative upon the invention, the scope of which is defined in the appended claims wherein

I claim:

1. A process for the manufacture of a highly pure dichlorododecafluoroheptane comprising fluorination of a polychloroheptane containing between 80% and 83% of organic chlorine by treatment with pentavalent antimony halides containing fluorine to a fluorine content of at least 50% by weight, separating from the fluorination product a distillate fraction distilling between 70° C. and 74° C. at standard pressure and comprising a compound having the formula $C_7H_2F_{12}$, chlorinating this fraction to a chlorine content of about 20% by weight, and fractionally distilling the chlorinated product so as to separate a dichlorododecafluoroheptane fraction distilling at about 126° C. at standard pressure.

2. A process for the manufacture of a highly pure dichlorododecafluoroheptane comprising fluorination of a mixture of polychloroheptanes containing between 10 and 12 chlorine atoms per molecule by treatment successively with anhydrous pentavalent antimony fluorochlorides and anhydrous antimony pentafluoride to provide a fluorinated polychloroheptane product containing at least 50% by weight of fluorine, separating from the fluorinated product a distillate fraction distilling at approximately 70°-74° C. at standard pressure and comprising a compound having the formula $C_7H_2F_{12}$, subjecting this fraction to photochemical chlorination in liquid phase by gaseous chlorine to an organic chlorine content of about 20% by weight, and fractionally distilling the chlorinated product so as to separate a dichlorododecafluoroheptane fraction distilling at about 126° C. at standard pressure.

3. The method of making a highly pure dodecafluoroheptene fraction suitable for use in the manufacture of chlorine-free perfluoroheptane from a mixture of polychlorinated heptanes containing between 10 and 12 chlorine atoms per molecule, which comprises fluorinating the mixture to a fluorine content of at least 50% by weight by treatment with pentavalent antimony halides containing fluorine, separating from the fluorinated product a distillate fraction distilling between about 70° C. and about 74° C. at standard pressure and comprising a compound having the formula $C_7H_2F_{12}$, chlorinating this fraction to a chlorine content of about 20% by weight, separating from the chlorinated product a fraction distilling at about 126° C. at standard pressure, and dechlorinating this fraction to provide an organic product essentially consisting of dodecafluoroheptene free from organic chlorine.

4. The method of making a highly pure dodecafluoroheptene fraction suitable for use in the manufacture of chlorine-free perfluoroheptane from a mixture of polychlorinated heptanes containing between 10 and 12 chlorine atoms per molecule, which comprises fluorinating the mixture to a fluorine content of at least 50% by weight by treatment successively with anhydrous pentavalent antimony fluorochlorides and anhydrous antimony pentafluoride, separating from the fluorinated product a distillate fraction distilling at approximately 70-74° C. at standard pressure and comprising a compound having the formula $C_7H_2F_{12}$, subjecting this fraction to photochemical chlorination in liquid phase by gaseous chlorine to an organic chlorine content of about 20% by weight, fractionally distilling the chlorinated product so as to separate a fraction distilling at about 126° C. at standard pressure, and dechlorinating this fraction by means of alcoholic zinc to provide an organic product essentially consisting of dodecafluoroheptene free from organic chlorine.

KARL W. KRANTZ.

REFERENCES CITED

The following references are of record in the file of this patent:

UNITED STATES PATENTS

| Number | Name | Date |
| --- | --- | --- |
| 2,407,246 | Benning et al. | Sept. 10, 1946 |
| 2,490,764 | Benning et al. | Dec. 13, 1949 |

OTHER REFERENCES

Locke et al., "J. A. C. S.," vol. 56, 1726-28 (1934).

McBee et al., "J. A. C. S.," vol. 62, 3340-41 (1940).